United States Patent
Campbell

(10) Patent No.: US 6,439,797 B1
(45) Date of Patent: Aug. 27, 2002

(54) FASTENER AND FASTENER-ROD ASSEMBLY

(76) Inventor: John G. Campbell, 555 Hillcliff, Waterford, MI (US) 48328

( * ) Notice: Subject to any disclaimer, the term of this patent is extended or adjusted under 35 U.S.C. 154(b) by 0 days.

(21) Appl. No.: 08/160,392

(22) Filed: Dec. 1, 1993

(51) Int. Cl.$^7$ ................................................. F16B 21/00
(52) U.S. Cl. ........................ 403/321; 403/316; 403/317; 403/322.1; 403/322.2; 403/325; 403/362
(58) Field of Search ............................... 285/315, 316, 285/317; 403/316, 317, 321, 322.1, 322.2, 325, 327, 362

(56) References Cited

U.S. PATENT DOCUMENTS

| | | | |
|---|---|---|---|
| 751,345 A | * 2/1904 | Saunders | 403/316 X |
| 1,054,126 A | * 2/1913 | Lindberg | 403/322 X |
| 1,353,299 A | 9/1920 | Wilson | 279/75 |
| 1,468,732 A | * 9/1923 | Bradbury | 285/316 X |
| 2,461,699 A | * 2/1949 | Scheiwer | 403/316 X |
| 3,302,960 A | * 2/1967 | Herrmann | 403/325 |
| 3,822,951 A | 7/1974 | Bornzin | 403/316 |
| 3,929,343 A | * 12/1975 | Wanner et al. | 403/317 X |
| 4,074,923 A | 2/1978 | Howe, Jr. | 384/541 |
| 4,529,197 A | 7/1985 | Gogarty | 482/107 |
| 4,579,337 A | 4/1986 | Uyeda | 482/107 |
| 4,616,952 A | 10/1986 | Schott | 403/316 |
| 4,638,994 A | 1/1987 | Gogarty | 482/107 |
| 4,709,454 A | 12/1987 | Barnes | 24/590 |
| 4,738,446 A | 4/1988 | Miles | 482/107 |
| 4,749,301 A | * 6/1988 | Suzuki | 403/322 |
| 4,773,641 A | 9/1988 | Metz | 482/107 |
| 4,775,269 A | * 10/1988 | Brix | 403/322 X |
| 4,893,810 A | 1/1990 | Lee | 482/107 |
| 4,903,383 A | 2/1990 | Gartshore | 24/706.8 |
| 4,960,344 A | 10/1990 | Geisthoff et al. | 403/316 |
| 5,062,631 A | 11/1991 | Dau et al. | 482/107 |
| 5,163,887 A | 11/1992 | Hatch | 482/107 |
| 5,265,970 A | * 11/1993 | La Barre | 403/322 X |

FOREIGN PATENT DOCUMENTS

| DE | 1068962 | * 11/1959 | 403/317 |
|---|---|---|---|

* cited by examiner

*Primary Examiner*—Robert J. Sandy
*Assistant Examiner*—Andrea Chop
(74) *Attorney, Agent, or Firm*—Lynn E. Cargill

(57) ABSTRACT

A fastener which includes an inner collar having an axial bore and a retractable projection projecting into the axial bore when the fastener is in a locked position and retractable out of the axial bore when the fastener is in a retracted position. The inner collar further has a tapered indentation in the outside surface. The fastener further includes an outer collar having an axial bore, the outer collar placed uniaxially and slidably over the inner collar and having a movable protuberance extending into the axial bore of the outer collar. The movable protuberance is shorter axially than the tapered indentation in the inner collar and is positioned in the tapered indentation. The fastener is in a locked position when the outer collar is in its resting position relative to the inner collar in which the movable protuberance is resting in the deepest portion of the tapered indentation. The fastener is in a retracted position when the outer collar is moved axially out of the resting position. The fastener further includes means for urging the movable protuberance into the axial bore of the outer collar. Also disclosed is a fastener-rod assembly which includes the above-described fastener and a rod onto which the fastener fastens.

15 Claims, 3 Drawing Sheets

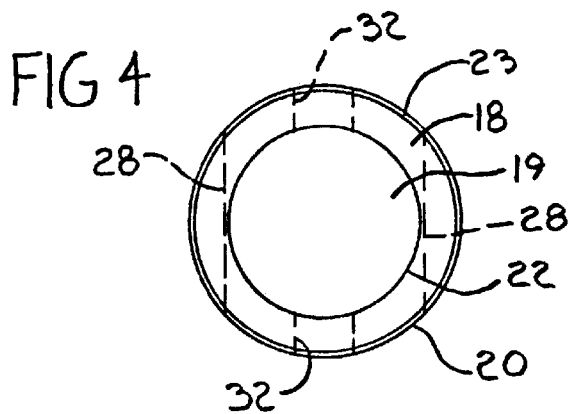
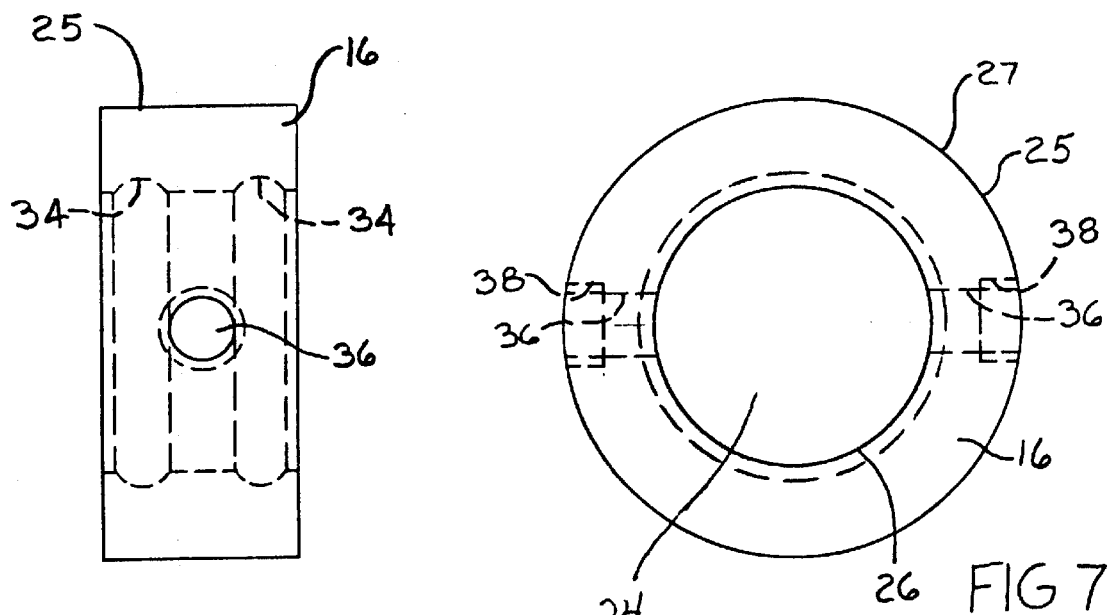
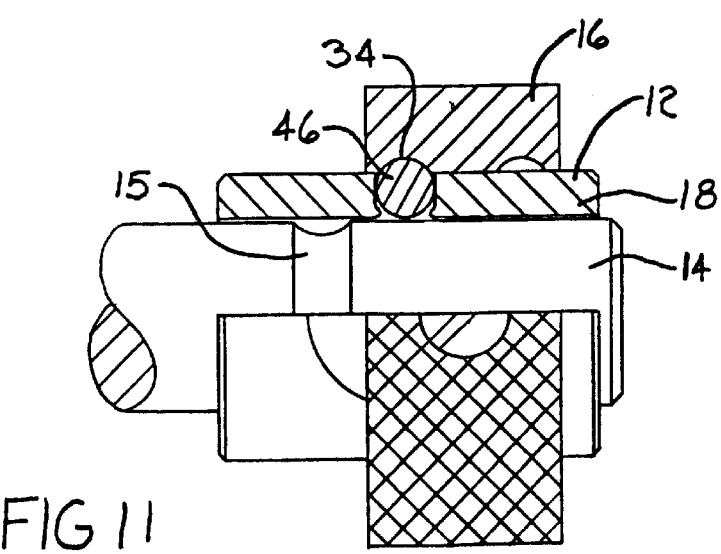

FASTENER AND FASTENER-ROD ASSEMBLY

TECHNICAL FIELD

This invention relates generally to fasteners and to fastener-rod assemblies.

BACKGROUND OF THE INVENTION

There exist many styles of fasteners which may be fastened to rod-like devices or rod-like extensions on devices. However, there remains a need for an improved fastener which is fastened quickly, is easy to use, exhibits strong fastening capability, and is of sturdy construction and design.

Some current fasteners rely on friction to hold the fasteners in place. However, fasteners which rely on friction can slip when the frictional surfaces get moist. Therefore, there is a need for an improved fastener which does not rely on friction to hold it in place.

It is a primary object of the present invention to provide a fastener which may be fastened to a rod or rod-like extension which fastens quickly, is easy to use, exhibits strong fastening capability, and is of sturdy construction and design.

It is another object of the present invention to provide a fastener which does not rely on friction to hold the fastener in place.

It is another object of the present invention to provide a fastener-rod assembly which is quick and easy to use, exhibits strong fastening capability, and is of sturdy construction and design.

SUMMARY OF THE INVENTION

In accordance with a preferred embodiment of the invention, these and other objects and advantages are addressed as follows. A fastener for fastening onto a rod is disclosed which includes an inner collar having an axial bore therethrough and a retractable projection projecting into the axial bore when the fastener is in a locked position and retractable out of the axial bore when the fastener is in a retracted position. The inner collar also has a tapered indentation in the outside surface thereof. The fastener also includes an outer collar having an axial bore therethrough. The outer collar is placed uniaxially over the inner collar and has a movable protuberance extending into its axial bore. The movable protuberance is shorter axially than the tapered indentation in the inner collar and is positioned in the tapered indentation. The outer collar is slidable along the inner collar. The fastener is in a locked position when the outer collar is in its resting position relative to the inner collar in which the movable protuberance is resting in the deepest portion of the tapered indentation. The fastener is in a retracted position when the outer collar is moved axially out of the resting position. The fastener further includes means for urging the movable protuberance into the axial bore of the outer collar. The fastener is designed such that it may be locked on the rod when in the locked position and removed from the rod when in the retracted position. An assembly employing such a fastener with a rod having an annular groove on the outside thereof is also disclosed.

BRIEF DESCRIPTION OF THE DRAWINGS

The nature and extent of the present invention will be clear from the following detailed description of the particular embodiments thereof, taken in conjunction with the appendant drawings, in which:

FIG. 4 shows an end elevational view of the inner collar shown in FIG. 2;

FIG. 6 shows a top plan view of the outer collar of the fastener of FIG. 1;

FIG. 7 shows an end elevational view of the outer collar shown in FIG. 5;

FIG. 11 shows a top view of the fastener of FIG. 1 on a rod, the fastener being in partial cross section.

DETAILED DESCRIPTION OF THE INVENTION

Figure 1:
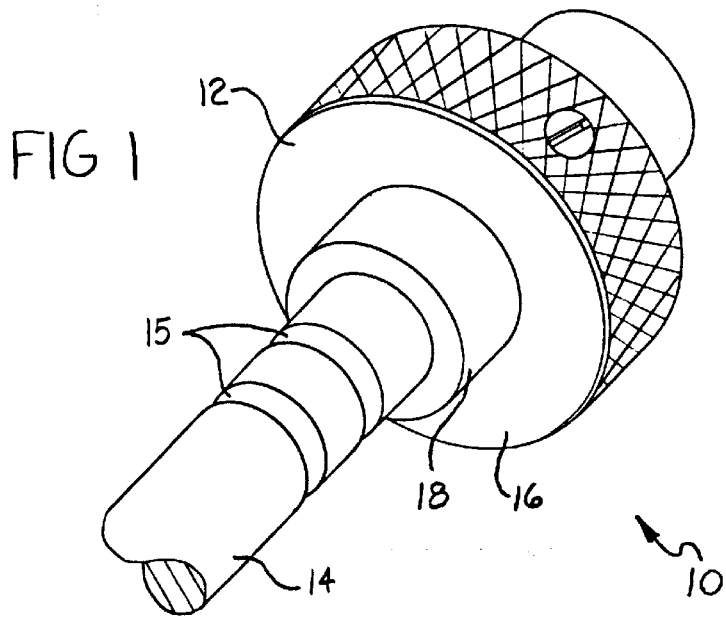
FIG. 1 shows a perspective view of a fastener of the present invention having an inner collar and an outer collar being fastened onto a rod.

A fastener-rod assembly 10 of the present invention is shown in FIG. 1. The assembly 10 includes a fastener 12 and a cylindrical rod 14. The fastener 12 includes an outer collar 16 placed uniaxially over an inner collar 18. The outer collar 16 is shorter than the inner collar 18, although it is not required to be so. The fastener 12 is lockable onto the rod 14 at each annular groove 15 on the outside surface of the rod 14. The design of the fastener 12 and the mechanism for locking onto the rod 14 will be understood by the following description taken in conjunction with the Figures.

Figure 2:
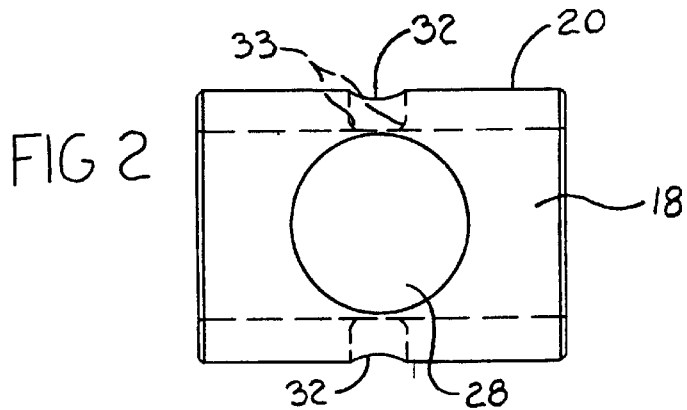
FIG. 2 shows a top plan view of the inner collar of the fastener of FIG. 1.
Figure 3:
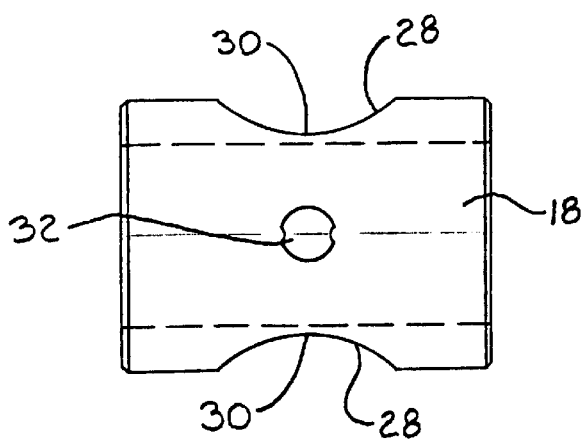
FIG. 3 shows a side elevational view of the inner collar of the fastener of FIG. 1.

Top, side, and end views of the inner collar 18 are shown in FIGS. 2, 3, and 4, respectively. The inner collar 18 is generally cylindrically shaped and has an axial bore 19 therethrough and an outside surface 20. The axial bore 19 of the inner collar 18 is defined by the inside perimeter 22 of the inner collar 18. The inner collar 18 has an outside perimeter 23. The outside perimeter 23 of the inner collar 18 and the inside perimeter 22 of the inner collar 18 are both circular.

Figure 5:
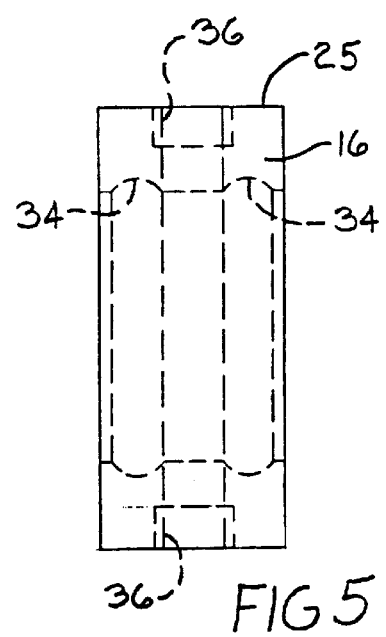
FIG. 5 shows a side elevational view of the outer collar of the fastener of FIG. 1.

Side, top, and end views of the outer collar 16 are shown in FIGS. 5, 6, and 7, respectively. The outer collar 16 is also generally cylindrically shaped and has an axial bore 24 therethrough and an outside surface 25. The axial bore 24 of the outer collar 16 is defined by the inside perimeter 26 of the outer collar 16. The outer collar 16 has an outside perimeter 27. The outside perimeter 27 of the outer collar 16 and the inside perimeter 26 of the outer collar 16 are both circular.

However, the inside and outside perimeters of the collars 16 and 18 and the rod 14 do not have to be circular, but may be other shapes, e.g., square, rectangular, triangular, hexagonal, etc., so long as the outer collar 16 is slidable along the inner collar 18. To allow the outer collar 16 to slide along the inner collar 18, it is preferred that the shape of the inside perimeter 26 of the outer collar 16 has the same shape as and be slightly larger than the outside perimeter 23 of the inner collar 18. The inside perimeter 26 of the outer collar 16 and the outside perimeter 23 of the inner collar 18 are both circular.

The inner collar 18 has two tapered indentations 28 in the outside surface 20. The tapered indentations 28 have a finite radial length and are radially in-line and spaced 180° apart. The tapered indentations 28 are semi-spherically shaped in that their shape is a partial sphere. The tapered indentations 28, however, may be of different shapes, e.g., triangular. The shape of the tapered indentations 28 may be such that the depth of the tapered indentations 28 gradually increases toward the inside of the tapered indentations 28, as it is shown in the Figures. Since the tapered indentations 28 are shown as being semi-spherical, the deepest depth of the tapered indentations 28 is in the middles 30 of tapered indentations 28; however, this does not have to be the case. The deepest depth of the tapered indentations 28 may be at one end of the tapered indentations 28, in which case, the outer collar 16 could only slide in one direction along the inner collar 18.

The inner collar 18 also has two radially-extending bores 32 extending from the outside surface 20 to the axial bore 19 of the inner collar 18. Radially-extending bores 32 are radially in-line and spaced 180° apart. The radially-extending bores 32 are radially spaced away from the tapered indentations 28, such that one radially-extending bore 32 is at 0° and one is at 180° and one tapered indentation is at 90° and one is at 270°. Each of the radially-extending bores 32 has an outer diameter at the outside surface 20 which will hereinafter be referred to as the "outer diameter". The diameter of the radially-extending bores 32 near the axial bore 19 will hereinafter be referred to as the "inner diameter". The inner diameter of the radially-extending bores 32 has two crimps 33 which make the effective inner diameter smaller than its corresponding outer diameter. The effective diameter is the minimum distance across the opening of a radially-extending bore 32.

The outer collar 16, as shown in FIGS. 5, 6, and 7, has two impressions 34 in the inside surface thereof and two radial holes 36. The radial holes 36 are radially in-line, are spaced 180° apart, and each include a threaded portion 38 shaped to house a screw head. The impressions 34 are rounded annular impressions, and one is positioned on each side of the radial holes 36. The impressions 34 do not have to be annular, although this feature makes the fastener 12 easier to use.

Figure 8:
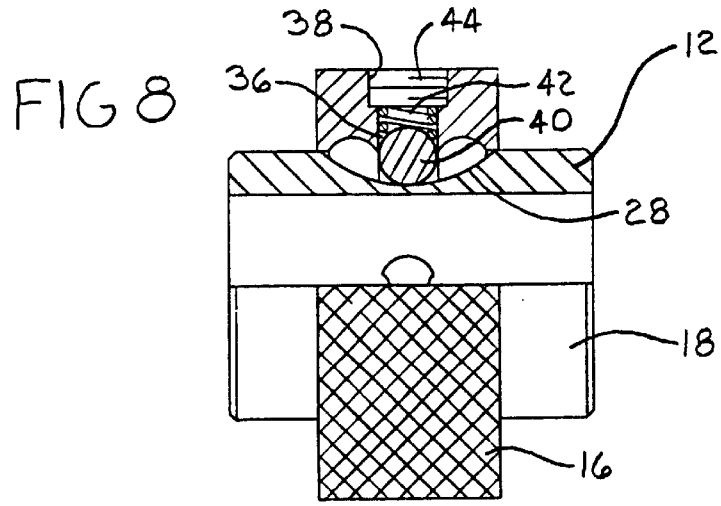
FIG. 8 shows a side view of the fastener of FIG. 1 in partial cross section.

FIG. 8 shows fastener 12 in partial cross section in the normal, resting position. From the cross-section, it can be seen that fastener 12 includes a movable protuberance (ball 40), a spring 42, and a screw head 44. The ball 40 is positioned in the radial hole 36 of the outer collar 16 such that it extends partially into the axial bore 24 of the outer collar 16 and rests in the tapered indentation 28 of the inner collar 18. The screw head 44 is threaded into threaded portion 38. Between the screw head 44 and the ball 40 is the spring 42 contracted due to the pressure caused by the screw head 44. The screw head 44 and the spring 42 form a spring-loaded mechanism which forces the ball 40 into the axial bore 24 of the outer collar. Means other than a spring and screw head may be employed for urging the ball 40 into the axial bore 24. For example, in place of the spring 42, an element formed of compressible rubber would also operate in the present invention.

The ball 40 is shown resting in the middle of the tapered indentation 28, which location has the deepest depth of the tapered indentation 28. The radius of the tapered indentation 28 is larger than the radius of the ball 40. The tapered indentation 28 and the ball 40 determine the distance the outer collar 16 can slide along the inner collar 18 in either direction. As the outer collar 16 is slid along the inner collar 18, the ball 40 is forced further into the radial hole 36, because the ball 40 is then abutting a more shallow depth of the tapered indentation 28. The spring 42 contracts further allowing the ball 40 to enter further into the radial hole 36. In either direction, the outer collar 16 is limited in sliding motion as the depth at each end of the tapered indentations 28 gets too shallow to house the ball 40. From the detail of the fastener 12 shown in FIG. 8, it can be seen that the fastener 12 has a normal, resting position where the ball 40 is positioned in the deepest depth of the tapered indentation 28.

Figure 9:
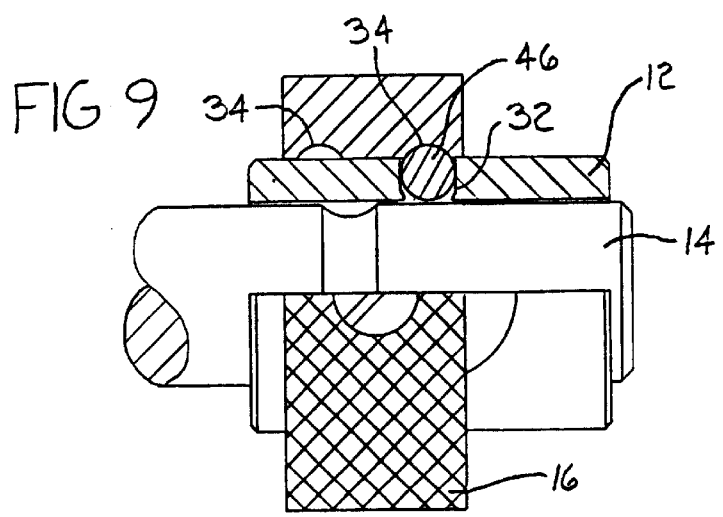
FIG. 9 shows a top view of the fastener of FIG. 1 on a rod, the fastener being in partial cross section.

FIG. 9 shows the fastener 12 being slid onto the rod 14. The fastener 12 includes a retractable projection (spherical member 46) which is positioned in the radially-extending bore 32. Due to the position of the radially-extending bore 32, the spherical member 46 is radially spaced away from either tapered indentation 28. The spherical member 46 is sized such that it is too large to pass through the inner diameter of the radially-extending bore 32 so that it only partially extends into the axial bore 19 of the inner collar 18. The spherical member 46 remains in the inner collar 18 and cannot fall into the axial bore 19 of the inner collar 18. The spherical member 46 is sized small enough to pass through the outside diameter of the radially-extending bore 32, for easier assembly of the fastener 12.

The spherical member 46 and the impressions 34 are sized and shaped so that the spherical member 46 fits into the impressions 34. In FIG. 9, the fastener 12 is being slid onto the rod 14, such that the outer collar 16 is slid to the left end of the inner collar 18. During this sliding motion, the spherical member 46 is retracted out of the axial bore 19 of the inner collar 18 and is positioned in the radially-extending bore 32 of the inner collar 18 and in one of the impressions 34 of the outer collar 16. The fastener 12 shown in FIG. 9 is considered to be in the retracted position, since the spherical member 46 is retracted into the inner collar 18.

Figure 10:
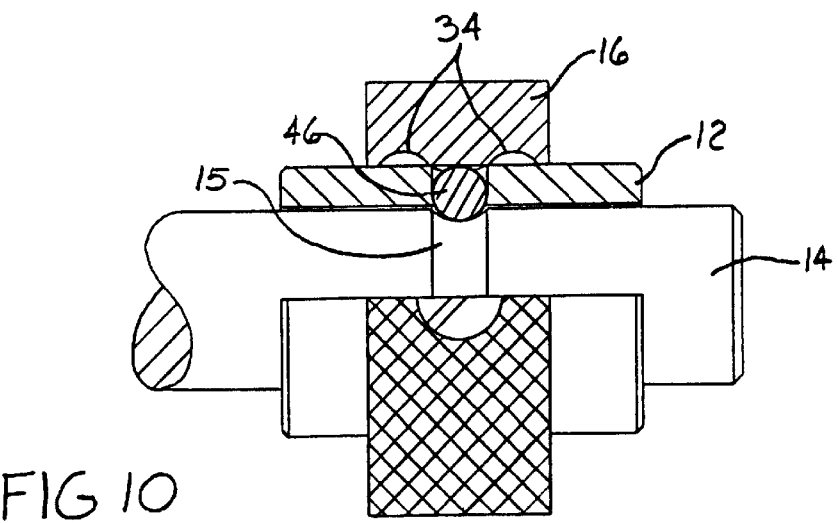
FIG. 10 shows a top view of the fastener of FIG. 1 locked on a rod, the fastener being in partial cross section.

As the fastener 12 is further slid onto the rod 14, the spherical member 46 drops into one of the annular grooves 15 on the rod 14. The spherical member 46 and the annular grooves 15 are sized so that the spherical member 46 fits into the annular grooves. Once the spherical member 46 is positioned in one of the annular grooves 15, the spherical member 46 is no longer in one of the impressions 34 of the outer collar 16, and the outer collar 16 is then allowed to return to its normal resting position, as shown in FIG. 10. In this position, the fastener 12 is considered to be in the locked position, since it is locked onto the rod 14. When the fastener 12 is in the locked position, the spherical member 46 happens to be radially in line with the ball 40.

FIG. 11 shows the fastener 12 being removed from the rod 14, during which the outer collar 16 is slid toward the right end of the inner collar 18. During this sliding motion, the spherical member 46 is retracted into one of the impressions 34 of the outer collar 16 and out of the annular groove 15 on the rod 14. In this retracted position, the fastener 12 may be removed from the rod 14. When the fastener 12 is off the rod 14, the spring-loaded balls 40 force the outer collar 16 back to the center of the inner collar 18.

The design of fastener 12 allows the fastener 12 to be placed on the rod 14 by directing either end of fastener 12 onto the rod 14.

The fastener 12 shown in the figures has two sets of mechanisms for allowing the outer collar 16 to slide along the inner collar 18 in a limited, controlled fashion, that is, the tapered indentations 28 in the inner collar 18 and the balls 40. However, only one such mechanism is required for the invention. Alternatively, more than two such mechanisms may be employed. The fastener 12 also has two sets of mechanisms for locking and unlocking the fastener 12 onto the rod 14, that is, the impressions 34 in the outer collar 16 and the spherical members 46. However, only one such mechanism is required for the invention. Alternatively, more than two such mechanisms may be employed.

In an alternative embodiment, the impressions 34 are not necessary, so long as there is a place into which the retractable projection (the spherical member 46) may be retracted. For example, the outer collar 16 may be significantly shorter in length so that, when the outer collar 16 is slid toward one end of the inner collar 18, the spherical member(s) 46 are allowed to partially jut out of the inner collar 18 onto the side of the outer collar 16.

Optionally, the fastener 12 may include a stop to further ensure that the outer collar 16 will slide a limited distance along the inner collar 18 in either direction.

The fasteners and fastener-rod assemblies of the present invention may be formed of metal, plastic, or any other suitable material.

The fastener or fastener-rod assembly of the present invention may be used for barbells, in that the fastener may be placed on the end of a barbell to retain the weights thereon. Alternatively, the fastener may be used as a wheel retainer attachable to an automobile axle. The fastener or fastener-rod assembly of the present invention may also be used in connecting two elements together, e.g., connecting a shaft to a motor or connecting two pipes or hoses together. The fastener or fastener-rod assembly of the present invention may also be used in telescoping devices, at the point of telescoping, e.g., devices such as the legs of microphones and tripods. The fastener or fastener-rod assembly of the present invention may also be used in devices wherein the fastener is the item desirably attached to another item. For example, the fastener of the present invention could be the weight itself in a barbell set.

Thus, there is provided in accordance with the present invention, a fastener which may be fastened to a rod or rod-like device which fastens quickly, is easy to use, exhibits strong fastening capability, and is of sturdy construction and design. The present invention also provides fastener-rod assemblies which enjoy the same advantages of the fastener of the present invention.

While my invention has been described in terms of a specific embodiment, it will be appreciated that other embodiments could readily be adapted by one skilled in the art. Accordingly, the scope of my invention is to be limited only by the following claims.

What is claimed is:

1. A fastener, comprising:
    (a) an inner collar having an axial bore therethrough and a retractable projection projecting into the axial bore of the inner collar when the fastener is in a locked position and retractable out of the axial bore of the inner collar when the fastener is in a retracted position, the inner collar having a tapered indentation in the outside surface thereof, said tapered indentation being radially spaced away from the retractable projection;
    (b) an outer collar having an axial bore therethrough, the outer collar placed uniaxially over the inner collar and having a movable protuberance extending into the axial bore of the outer collar, the movable protuberance being shorter axially than the tapered indentation in the inner collar and being positioned in the tapered indentation, the outer collar being slidable along the inner collar, the fastener being in a locked position when the outer collar is in its resting position relative to the inner collar in which the movable protuberance is resting in the deepest portion of the tapered indentation, the fastener being in a retracted position when the outer collar is moved axially out of the resting position; and
    (c) means for urging the movable protuberance into the axial bore of the outer collar, wherein the movable protuberance and the retractable projection are positioned radially in line when the fastener is in the locked position.

2. The fastener of claim 1, wherein the inner collar has a radially-extending bore therethrough, the radially-extending bore having an inner diameter and an outer diameter, the inner diameter being less than the outer diameter, the retractable projection being a spherical member positioned in the radially-extending bore, the diameter of the spherical member being greater than the inner diameter of the radially-extending bore, so that the spherical member projects only partially through the inner diameter when the fastener is in the locked position.

3. The fastener of claim 1, wherein the tapered indentation in the inner collar has a finite radial distance.

4. The fastener of claim 1, wherein the tapered indentation is semispherical.

5. The fastener of claim 1, wherein the inner collar is longer than the outer collar.

6. The fastener of claim 1, wherein the deepest portion of the tapered indentation is the middle of the tapered indentation.

7. The fastener of claim 1, wherein the movable protuberance is spherical.

8. The fastener of claim 1, wherein the outer collar has an impression on the inside surface thereof providing a space into which the retractable projection may be retracted.

9. The fastener of claim 1, wherein the urging means comprises a spring-loaded device placed over the movable protuberance.

10. The fastener of claim 1, wherein the outer collar has a radial hole therethrough and the movable protuberance is a ball positioned partially in the radial hole and partially extending into the outer collar axial bore.

11. The fastener of claim 1, wherein the tapered indentation is semispherical and the radius of the tapered indentation is larger than the radius of the movable protuberance.

12. A fastener for fastening onto a rod, comprising:
    (a) an inner collar having an axial bore therethrough and a retractable spherical member projecting into the axial bore of the inner collar when the fastener is in a locked position and retracted out of the axial bore of the inner collar when the fastener is in a retracted position, the inner collar having a radially-extending bore therethrough, the radially-extending bore having an inner diameter and an outer diameter, the inner diameter being less than the outer diameter, the retractable spherical member positioned in the radially-extending bore, the diameter of the spherical member being greater than the inner diameter of the radially-extending bore, so that the spherical member projects partially through the inner diameter when the fastener is in the locked position, the inner collar having a semispherical indentation in the outside surface thereof, the semispherical indentation being radially spaced away from the retractable spherical member,
    (b) an outer collar having an axial bore therethrough, the outer collar placed uniaxially over the inner collar and having a radial hole therethrough and a ball positioned partially in the radial hole and partially extending into the semispherical indentation, the radius of the ball being smaller than the axial length of the semispherical indentation in the inner collar, the outer collar having an impression on the inside surface thereof providing a space into which the retractable spherical member may be retracted, the outer collar being slidable along the inner collar, the fastener being in a locked position when the outer collar is in its resting position relative to the inner collar in which the ball is resting in the middle of the semispherical indentation, the fastener being in a retracted position when the outer collar is moved axially out of the resting position; and (c) means for urging the ball into the axial bore of the outer collar, the fastener being such that it may be locked on the rod when in the locked position and removed from the rod when in the retracted position.

13. The fastener of claim 12, wherein the inner collar is longer than the outer collar.

14. The fastener of claim 12, wherein the urging means comprises a spring-loaded device placed over the ball.

15. A fastener and rod assembly, comprising:

(a) an inner collar having an axial bore therethrough and a retractable projection projecting into the axial bore of the inner collar when the fastener is in a locked position and retracted out of the axial bore of the inner collar when the fastener is in a retracted position, the inner collar having a tapered indentation in the outside surface thereof, wherein the tapered indentation is radially spaced away from the retractable projection;

(b) an outer collar having an axial bore therethrough, the outer collar placed uniaxially over the inner collar and having a movable protuberance extending into the axial bore of the outer collar, the movable protuberance being shorter axially than the tapered indentation in the inner collar and being positioned in the tapered indentation, the outer collar being slidable along the inner collar, the fastener being in a locked position when the outer collar is in its resting position relative to the inner collar in which the movable protuberance is resting in the deepest portion of the tapered indentation, the fastener being in a retracted position when the outer collar is moved axially out of the resting position, and wherein the movable protuberance and the retractable projection are positioned radially in line when the fastener is in the locked position;

(c) means for urging the movable protuberance into the axial bore of the outer collar;

the fastener being such that it may be locked on the rod when in the locked position and removed from the rod when in the retracted position, and (d) a rod having an annular groove on the outside surface thereof so that the fastener is lockable on the rod, the retractable projection and the annular groove being sized so that the retractable projection fits into the annular groove, thereby locking the fastener on the rod.

* * * * *